United States Patent [19]
Dunn et al.

[11] Patent Number: 5,293,276
[45] Date of Patent: Mar. 8, 1994

[54] METHOD FOR GENERATING A REFERENCE SIGNAL FROM UNIQUE SERVO MARK PATTERN DETECTION

[75] Inventors: Mary E. Dunn, Longmont; David E. Norton, Jr., Boulder, both of Colo.

[73] Assignee: Fujitsu Limited, Kawasaki, Japan

[21] Appl. No.: 825,387

[22] Filed: Jan. 24, 1992

[51] Int. Cl.$^5$ .............................. G11B 5/09
[52] U.S. Cl. ........................ 360/51; 360/49; 360/50; 360/48
[58] Field of Search ........... 360/48, 49, 50, 51, 360/77.05, 77.07, 77.08

[56] References Cited

U.S. PATENT DOCUMENTS

| | | | |
|---|---|---|---|
| 3,631,421 | 12/1971 | Perkins. | |
| 3,986,208 | 10/1976 | Sykes. | |
| 4,345,280 | 8/1982 | Blagaila et al. | |
| 4,367,497 | 1/1983 | Jenkins. | |
| 4,424,543 | 1/1984 | Lewis et al. | 360/77.08 |
| 4,495,533 | 1/1985 | Chambers. | |
| 4,507,693 | 3/1985 | Matsuda et al. | |
| 4,746,997 | 5/1988 | Shrinkle et al. | |
| 4,825,310 | 4/1989 | Song | 360/77.08 |
| 4,862,443 | 8/1989 | Tsuji et al. | 369/59 |
| 4,933,786 | 6/1990 | Wilson | 360/77.05 |
| 4,984,100 | 1/1991 | Takayama et al. | |

FOREIGN PATENT DOCUMENTS 0341852 11/1989 European Pat. Off.
WO85/01402 3/1985 PCT Int'l Appl.

OTHER PUBLICATIONS

Patent Abstracts of Japan, vol. 10, No. 160, Jun. 7, 1986, JP-A-61 013 476, Nippon Denshin Denwa.
Patent Abstracts of Japan, vol. 10, No. 344, Nov. 20, 1986, JP-A-61 144 776, Ricoh Co. Ltd.

*Primary Examiner*—Donald Hajec
*Assistant Examiner*—T. N. Forbus, Jr.
*Attorney, Agent, or Firm*—Curtis, Morris & Safford

[57] ABSTRACT

A plurality of data sequences having patterns distinguishable from informational data are recorded as a servo mark portion of servo information on a disk. Upon decoding a predetermined number of these data sequences, a determination is made as to whether an accurately located servo mark has been detected. The detected servo mark provides a reference from which the beginning of recorded servo burst data can be located, thereby enabling all of the servo burst data to be read. The presence of defects does not inhibit the detection of the servo mark.

27 Claims, 5 Drawing Sheets

| A,C,D,E | CURRENT STATE: X,Y,Z | NEXT STATE: X',Y',Z' | /SYNC EN-: | /SYNC EN+-: |
|---|---|---|---|---|
| 1,0,0,0 | 0,0,0 | 0,0,0 | 1 | 1 |
| 0,1,0,0 | 0,0,0 | 0,0,0 | 1 | 1 |
| 0,0,1,0 | 0,0,0 | 0,0,1 | 1 | 1 |
| 0,0,0,1 | 0,0,0 | 1,0,0 | 1 | 1 |
| 1,0,0,0 | 0,0,1 | 0,0,0 | 1 | 1 |
| 0,1,0,0 | 0,0,1 | 1,1,0 | 1 | 1 |
| 0,0,1,0 | 0,0,1 | 0,1,0 | 1 | 1 |
| 0,0,0,1 | 0,0,1 | 1,1,0 | 1 | 1 |
| 1,0,0,0 | 0,1,0 | 0,0,0 | 1 | 1 |
| 0,1,0,0 | 0,1,0 | 0,1,1 | 1 | 1 |
| 0,0,1,0 | 0,1,0 | 0,0,0 | 1 | 1 |
| 0,0,0,1 | 0,1,0 | 1,1,0 | 1 | 1 |
| 1,0,0,0 | 0,1,1 | 0,0,0 | 1 | 1 |
| 0,1,0,0 | 0,1,1 | 0,0,0 | 1 | 0 |
| 0,0,1,0 | 0,1,1 | 0,0,0 | 1 | 0 |
| 0,0,0,1 | 0,1,1 | 0,0,0 | 1 | 1 |
| 1,0,0,0 | 1,0,0 | 0,0,0 | 1 | 1 |
| 0,1,0,0 | 1,0,0 | 1,1,0 | 1 | 1 |
| 0,0,1,0 | 1,0,0 | 0,0,0 | 1 | 1 |
| 0,0,0,1 | 1,0,0 | 0,0,0 | 1 | 1 |
| 1,0,0,0 | 1,0,1 | 0,0,0 | 1 | 1 |
| 0,1,0,0 | 1,0,1 | 1,1,0 | 1 | 1 |
| 0,0,1,0 | 1,0,1 | 0,0,0 | 1 | 1 |
| 0,0,0,1 | 1,0,1 | 0,0,0 | 1 | 1 |
| 1,0,0,0 | 1,1,0 | 0,0,0 | 0 | 1 |
| 0,1,0,0 | 1,1,0 | 0,0,0 | 1 | 1 |
| 0,0,1,0 | 1,1,0 | 0,0,0 | 1 | 1 |
| 0,0,0,1 | 1,1,0 | 0,0,0 | 1 | 1 |

*FIG. 6*

METHOD FOR GENERATING A REFERENCE SIGNAL FROM UNIQUE SERVO MARK PATTERN DETECTION

BACKGROUND OF THE INVENTION

1. Field of the Invention

This invention relates to a method and apparatus for generating and detecting servo marks and, more particularly, to a technique for detecting a servo mark pattern as a unique pattern of data sequences and for generating a timing reference therefrom.

2. Description of the Prior Art

In the prior art, a magnetic disk having so-called sectored or embedded servo information contains servo information which is utilized for positioning or re-aligning a recording/reproducing head or heads, on the same disk surface as data information. More specifically, the magnetic disk typically contains a plurality of tracks each of which is divided into a plurality of sectors. Each sector in the embedded servo system contains servo, informational, address and synchronization data and may, for example, be formatted as shown in FIG. 1. That is, each sector includes a recovery area, a servo information section and a read/write section.

The recovery portion provides the time needed for the circuitry contained within the associated disk drive unit to change modes as, for example, between a write mode in a preceding sector and a read mode for reading servo information in the current sector. As is to be appreciated, while the circuitry is changing modes, data are not properly read and processed. Therefore, since the disk is continuously rotating, the sector portion which occurs during the time required for the mode change is unavailable for data transfer. As a result, the recovery portion does not contain any servo or read/write data and, as an example, may just contain a pre-recorded high frequency signal.

The servo information section of the sector includes a DC erase portion, a track address portion and a servo positioning burst portion. The DC erase portion typically includes a series of blanks or "0" bits which exceed the number of consecutive "0" bits permitted to occur in other areas of the sector. As a result, when this number of "0" bits is detected by a servo control circuit contained within the disk drive unit, the servo system is conditioned for locating the servo burst data as hereinafter described. The track address portion contains data representing the current track number which, for example, may be expressed in Gray code. The servo positioning burst portion 19 contains servo burst data as, for example, shown in FIG. 2, which are utilized for detecting tracking errors and for re-aligning the recording/reproducing head or heads. That is, any positional misalignment relative to the track being scanned is determined upon reading the servo burst data. The misalignment information is supplied in a closed loop feedback path to the servo control circuit, whereupon the position of the head or heads is appropriately re-adjusted or corrected.

The read/write section of a sector includes an address mark, a synchronization portion, an identifying number and an informational data portion. The synchronization portion contains synchronization data which when provided to a phase locked loop circuit contained in the disk drive unit enables an internal clock or voltage controlled oscillator to be synchronized to the rate at which data are transferred to and from the disk. The identifying portion includes data which represents a sector identifying number. Thus, by utilizing data from the track address and the identifying portions, a desired information data portion can be located. The informational data portion is utilized for writing and reading therefrom user generated data.

It is seen that, in the prior art embedded servo system, upon completing the writing of data into an informational data portion of a preceding sector, a change-over delay in the form of the recovery area allows the disk drive circuitry to change from a write mode to a read mode. Afterwards, if the DC erase portion is properly detected, a timing reference is established from which the servo burst data may be located in either a synchronous or an asynchronous manner. A typical synchronous approach utilizes a phase locked loop data field recorded in the servo information section for synchronizing a voltage controlled oscillator to the rate at which data are read from the phase locked loop data field. As is to be appreciated, the area required for the phase locked loop data field reduces the area available in the sector for informational data. Further, the use of a phase locked loop circuit increases the overall circuit complexity and cost. Moreover, since during seek operations (i.e. the locating of a desired track or sector) the read data may have a relatively large variation in amplitude and phasing, obtaining a proper phase locking may be difficult.

On the other hand, in a conventional asynchronous approach, upon the detection of the DC erase portion, a trigger signal is generated from which a predetermined number of clock pulses is counted so as to locate the servo burst data. However, due to defects which may be present in the DC erase portion, the detection of the DC erase portion and the establishing of the timing reference may not always occur at the same relative location in each sector. Therefore, since the number of clock pulses which are counted after the timing reference is fixed, the reading of the servo burst data may not always start at the beginning of the burst portion. As a result, the length of the servo burst portion may be made longer than necessary so as to insure that sufficient servo burst data are always available.

As is to be appreciated, proper detection of the DC erase portion is required to insure the proper subsequent transfer of data. However, the occurrence of defects known as drop-ins (i.e. erroneous extra data pulses which occur during either the recording or reproducing processing of the DC erase portion) may interrupt the uniquely long sequence of "0" bits so that the DC erase portion may appear to contain several shorter sequences of "0" bits and, as such, may prevent the detection of the DC erase portion. If this occurs, a timing reference is not established and, as a result, the servo control circuit does not properly locate the servo burst data and the head or heads may not be properly re-aligned as previously described. In this situation, the servo burst data may be interpreted incorrectly and may, for example, be mistaken for informational data. Further, defects known as drop-outs (i.e. data pulses which drop-out or are "lost" due to defects occurring during either the recording or reproducing processing) which occur in the sector, for example, in the informational data portion, could cause an area within the informational data portion to be mis-interpreted as a DC erase portion. As a result, the servo control circuit attempts to initiate the above-described procedure for locating servo burst data and, instead of servo burst data, receives the remaining informational data, whereupon the servo control circuit attempts to re-align the head or heads based on this incorrect data. Moreover, in this situation, the remaining informational data is not transferred and processed as informational data.

Thus, the prior art has failed to provide a technique for generating a timing reference from which the beginning of the servo burst portion can be readily located, even if defects are present within the sector, while using a minimal amount of sector area and being relatively inexpensive to implement.

OBJECTS AND SUMMARY OF THE INVENTION

An object of the present invention is to provide a method and apparatus for generating a servo mark pattern which overcomes the foregoing problems associated with the prior art.

More specifically, it is an object of the present invention to provide a method and apparatus for generating a servo mark pattern which may be utilized in accurately locating the start of servo burst data.

Another object of the present invention is to provide a method and apparatus for generating a detectable servo mark pattern as aforementioned which is relatively immune to defects.

It is a further object of the present invention to provide a method and apparatus for generating a servo mark pattern as aforementioned which is contained within the sector portion previously reserved for the DC erase portion.

In accordance with an embodiment of this invention, a method of generating a signal pattern for distinguishing servo data from informational data comprises the steps of: generating a first plurality of data sequences each having a first length, generating a second plurality of data sequences each having a second length, and inserting the signal pattern thus generated in an area of the servo information prior to the current servo data.

In accordance with another embodiment of this invention, a servo mark pattern recorded prior to the servo burst of servo information on a disk and having a first plurality of data sequences each exhibiting a first length and a second plurality of data sequences each exhibiting a second length is detected. A predetermined number of data sequences contained within the first and second pluralities of data sequences are detected from which it is determined whether an accurately located timing reference can be generated and from which the servo burst may be properly sensed.

Other objects, features and advantages according to the present invention will become apparent from the following detailed description of an illustrated embodiment when read in conjunction with the accompanying drawings in which corresponding components are identified by the same reference numerals.

BRIEF DESCRIPTION OF THE DRAWINGS

FIG. 6 is a state table associated with the state diagram of FIG. 5;

DETAILED DESCRIPTION OF A PREFERRED EMBODIMENT

Figure 3:
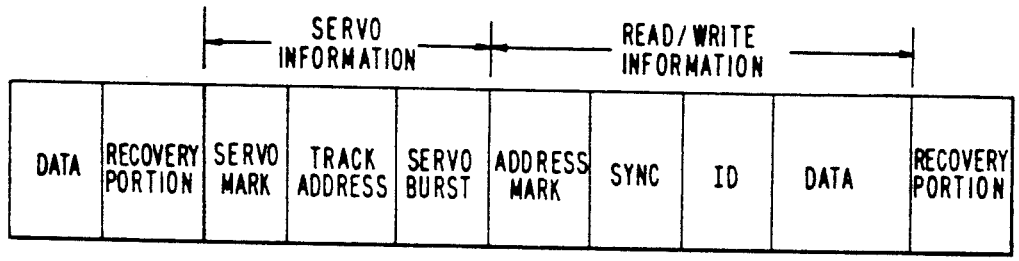
FIG. 3 is a diagram illustrating a sector format according to an embodiment of the present invention.
Figure 2:
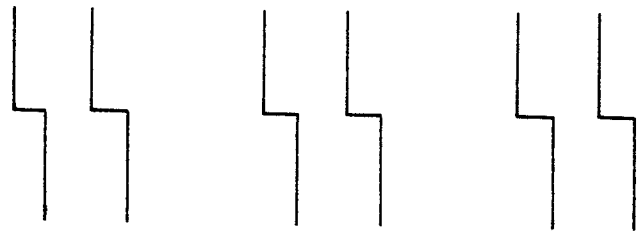
FIG. 2 is a diagram illustrating servo burst patterns.

FIG. 3 illustrates a sector format for a magnetic disk having an embedded servo according to an embodiment of the present invention. As shown therein, the sector format includes a recovery portion, a servo mark portion, a track address portion, a servo positioning burst portion, an address mark, a synchronization portion, an identifying number and an informational data portion. With the exception of the servo mark portion, the sector format shown in FIG. 3 is substantially identical to that previously described with reference to FIG. 1 and, as such, further description thereof will not be repeated.

Figure 1:
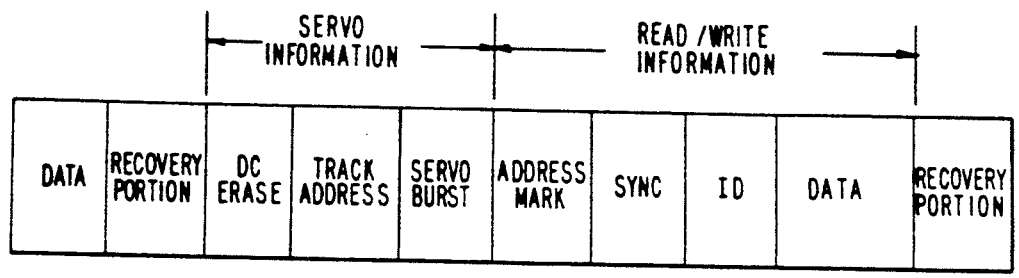
FIG. 1 is a diagram illustrating a sector format according to the prior art.
Figure 4A:
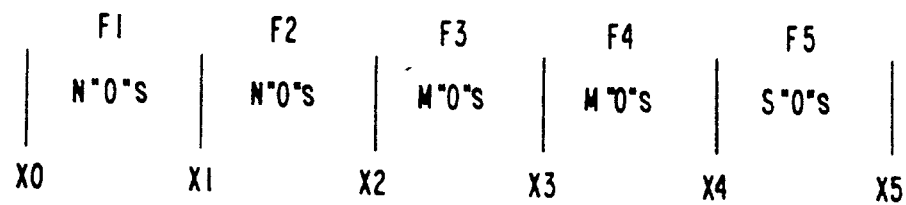
FIG. 4A is a diagram of a servo mark signal pattern according to an embodiment of the present invention.

As shown in FIG. 3, the servo mark portion is located after the recovery portion and, in a preferred embodiment, occupies substantially the same area as the DC erase portion of FIG. 1. The servo mark portion is formed of a plurality of data sequences. In a preferred embodiment, the servo mark portion contains five sequences, as shown in FIG. 4A, which are identified as F1, F2, F3, F4 and F5. Each sequence in the servo mark portion is defined by adjacent signal transitions, that is, sequence F1 is defined by transitions X0 and X1, sequence F2 is defined by transitions X1 and X2 and so forth. A plurality of data bit cells, each cell containing a "0" data bit, are contained in each sequence. More specifically, sequences F1 and F2 contain N "0" data bit cells, sequences F3 and F4 contain M "0" data bit cells and sequence F5 contains S "0" data bit cells. The values of N and M are selected so as to exceed the maximum permissible data run-length number of consecutively arranged "0" bits which may occur elsewhere in the sector and which is typically 7. In a preferred embodiment, the values selected for N, M and S are 14, 10 and 3, respectively, thus providing a configuration in which the spacing between transitions is decreasing. However, as is to be appreciated, the present invention is not limited to this configuration and may instead be applied to a configuration in which the spacing between transitions increases. Furthermore, the data contained in the plurality of data bit cells may have a predetermined pattern comprising dissimilar numbers of bits between transitions. Preferably, the illustrated sequences represent a minimum number of sequences that may be detected accurately, even in the environment of drop-ins and drop-outs, to provide a reference from which a timing reference mark may be generated.

Figure 4B:
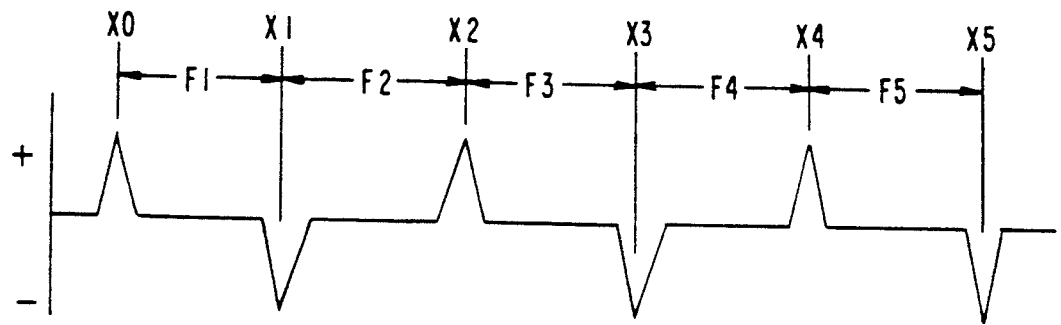
FIG. 4B is a diagram of the pattern of FIG. 4A illustrating the polarity of the signal transitions therein.

FIG. 4B illustrates the transitions between the sequences shown in FIG. 4A in which the polarity of adjacent transitions alternates. This alternating of transition polarities advantageously is utilized to differentiate between trigger transitions as hereinafter described.

If the sole purpose of the present servo mark pattern was to distinguish servo burst data from informational data, then sequences F1 to F4 could contain the same number of consecutive "0"s, provided that this number exceeded the previously mentioned run-length limited number 7. In this situation, a decoding apparatus would merely decode a predetermined number of sequences. For example, requiring the decoding of three out of four sequences may be sufficient for distinguishing servo mark data from informational data and also allow one sequence to be disregarded if a defect is present therein. Thereafter, a timing reference would be generated. However, the location of the timing reference would not be precisely known since the reference would be generated after decoding three sequences, which could occur after the third sequence if no defect is present, or after the fourth sequence if a defect is present in one of these sequences.

However, by using different length sequences as previously described, a timing reference can be generated which has a known location. More specifically, sequences F1-F5 are examined by a decoding apparatus contained within the disk drive unit and implemented in one embodiment by suitable logic circuitry which is hereinafter described. This examination includes detecting or decoding each sequence, that is, determining if the transitions X0, X1 ... X5 are positioned as shown in FIGS. 4A and 4B, thus providing a decoded length for each sequence. Any extra or drop-in transitions which may be present are also detected during this examination. If three sequences within the group of sequences F1-F4 are decoded, in which the length of at least two of the sequences are decoded exactly as hereinafter described and the length of the third is greater than a predetermined value, then a timing reference may be established or generated on the next transition which, in the preferred embodiment, is at either transition X4 or X5. For example, if sequences F1, F2 and F3 are decoded exactly, then a timing reference may be generated at transition X4. On the other hand, if a defect has occurred, for example, if transition X1 has dropped-out so that the sequence decoded at transition X2 represents one long sequence, and if sequences F3 and F4 are decoded exactly at transitions X3 and X4, respectively, then a timing reference may be generated at transition X5. As shown in FIG. 4B, the polarities of the transitions X4 and X5 are opposite each other. Thus, a reference to be generated at transition X4 can be readily distinguished from one to be generated at transition X5. Further, sequence F5 is decoded to assure that transition X5 is properly located in the event a defect is present in sequence F1 or F2 or F3 or F4, as hereinafter described. Sequence F5 thus is used for synchronizing the generation of the timing reference mark in the event a defect is present in one of the sequences F1, F2, F3 or F4.

The timing reference generated at transition X4 or X5 provides an accurate starting point from which the start of the servo burst data can be located. That is, since the locations of transitions X4 and X5 within the current sector are known, as previously described, the lengths between the transitions X4 and X5 and the start of the burst data are also known. Therefore, upon the generation of a timing reference at either transition X4 or X5, the corresponding distance to the start of the burst data is known. Thereafter, the present decoding apparatus, which utilizes an asynchronous counting circuit as hereinafter described, counts a selected predetermined number of clock pulses from the timing reference, which selected predetermined number corresponds to the distance between the location of the generated timing reference mark and the start of the burst data.

The present timing reference mark may be properly generated even if a predetermined number of defects are present within the servo mark portion. In a preferred embodiment, a reference can be properly generated if either a single drop-out transition defect occurs anywhere within the servo mark portion or a single drop-in transition defect occurs anywhere in the F5 sequence or in the F1 sequence (but not in both sequences). By so limiting the number of permissible defects, the circuit complexity and costs are reduced while still providing reliable performance under realistic operating conditions. For example, since drop-in transition defects are unlikely to occur, the limitation on the permissible types and numbers of these defects does not impair the normal operation of the system. Furthermore, as is to be appreciated, the present invention is not so limited and can be readily modified so as to accommodate a larger number of defects.

Four sequences represent the minimal number of sequences from which a reliable determination can be made on whether a timing reference mark can be properly generated if a single defect is present. More specifically, if only two sequences are utilized, then a single defect could inhibit the exact decoding of either sequence so that an accurate timing reference location would not be determined. In a three sequence approach, a single defect could cause only one sequence to be decoded exactly and, as a result, a timing reference may not be accurately located. As is to be appreciated, while more than four sequences may be utilized for generating a timing reference mark, this requires additional sector area and also increases the complexity and cost of the detection circuitry.

During normal operations, the sequences contained within the servo mark portion are read and supplied to the decoding apparatus so as to be decoded. The decoded values are analyzed and, as a result, if an accurately located timing reference mark can be generated, then such mark is generated on the next transition in the servo mark portion. However, if the decoded values indicate that the accuracy or the reliability of the timing reference mark location cannot be assured, then the generation of the timing reference mark is inhibited. When a timing reference mark is not generated, the data contained within the sector are disregarded and not processed. More specifically, the servo control circuit disregards the servo burst data and, as such, does not re-align the head or heads as previously described.

The algorithm utilized in the decoding apparatus for generating a reference mark, according to a preferred embodiment of the present invention, will now be described.

The present algorithm operates within the above-mentioned parameters. That is, three sequences are required to be decoded, the length of each sequence must be greater than a predetermined length, which in a preferred embodiment is equal to the length of the shorter sequence within the group of sequences F1-F4, and two of the three sequences must be decoded exactly before a timing reference mark is generated. That is, the lengths of two of the three sequences must be detected as being equal to their designated lengths. A single drop-out transition will not inhibit the generation of the timing reference mark, however, multiple drop-out transitions will. Since drop-in transitions may cause a high degree of uncertainty in the exact location of the reference mark, drop-in transitions usually result in an unacceptable decode condition and, as a result, usually inhibit the generation of a reference mark. However, a drop-in transition is tolerated by the present arrangement. Furthermore, the polarity of each transition is detected so as to differentiate between trigger transitions X4 and X5 and to determine when to trigger the timing reference mark (i.e. at a long delay following X4 or a short delay following X5).

More specifically, the algorithm decodes or classifies each read sequence as having one of four different lengths of data bit cells, that is, either the length of sequences F1 and F2 (hereinafter, referred to as D), the length of sequences F3 and F4 (hereinafter, referred to as C), a length greater than D (hereinafter, referred to as E) or a length less than C (hereinafter, referred to as A). As is to be appreciated, if any of the sequences F1 to F4 are decoded as having a length A, then the respective sequence contains at least one drop-in transition. Further, any sequence detected as having a length E is caused by at least one transition dropping-out.

When three sequences are decoded exactly, that is, the decoded length of each of three sequences is substantially the same as the actual length with which each of the respective sequences was recorded, then a timing reference mark is generated on the next transition provided that the decoded value of the sequence prior to the trigger transition is acceptable as hereinafter described. For example, if sequences F1, F2 and F3 are decoded exactly at transitions X1, X2 and X3 so as to obtain decoded values of D, D and C, respectively, and if the decoded value of the sequence prior to the trigger transition, which in this example is sequence F4, is acceptable, then a reference mark is generated at transition X4. However, if a defect eliminated one transition, for example, if transition X1 dropped-out such that a value of E is decoded at transition X2, but thereafter sequences F3 and F4 are decoded exactly at transitions X3 and X4, respectively, and if the decoded value of sequence F5 is acceptable, then a reference mark is generated at transition X5. In this situation, the length of the sequence decoded at transition X2 does not accurately identify sequence F2. However, as previously mentioned, to insure an accurate reference location only two sequences within the group of sequences F1–F4 have to be decoded exactly and a third sequence in this group must have a length equal to or greater than C.

Table 1 illustrates the acceptable and unacceptable decode situations in accordance with the present algorithms.

exact decode values are obtained at transitions X1, X2 and X3. That is, since sequence F1 has a length of D, as previously described, the decoded value obtained at transition X1 is D. In a similar manner, sequences F2 and F3 have lengths of D and C, respectively, so that the decoded values obtained at transitions X2 and X3 are D and C, respectively. Since all three sequences were decoded exactly, an accurate location within the servo mark portion can be determined and, as such, this condition represents an acceptable decode situation. Thus, a timing reference mark may be generated at the next transition which, for this condition, is transition X4.

In condition No. 2, transition X1 has dropped-out or is missing. As a result, the sequence decoded at transition X2 has a value of E (which, of course, is greater than C). Thereafter, since no defects are present within sequences F3 and F4, the values decoded at transitions X3 and X4 each have a value of C which are also the exact lengths of sequences F3 and F4. Since three sequences, that is, sequences F1/F2, F3 and F4, were decoded in which the first sequence was decoded with a value of E and two sequences, that is, sequences F3 and F4, were decoded exactly with values of C, i.e. they were detected as having exact lengths, an accurate reference location within the servo mark portion can be determined. Thus, this condition represents an acceptable decode situation and, as a result, a timing reference mark is generated at transition X5.

In condition No. 3, transition X2 is missing. As is to be appreciated, sequence F1 which is decoded at transition X1 is not affected and, as such, has a decoded value of D, which represents the exact length of the sequence. Since the transition X2 is missing, the next transition to be detected is X3 and, as a result, a decoded value of E is obtained thereat. Thereafter, since no other defects are present, the sequence length C is correctly decoded at transition X4. Thus, three sequences are decoded: sequences F1, F2/F3 and F4, and of these, two sequences (F1 and F4) are decoded exactly. As a result, an accurate reference location within the servo mark portion can be determined. Therefore, this situation represents an acceptable decode situation, such that a timing reference mark is generated at transition X5.

In condition No. 4, transition X3 is missing. As is to be appreciated, the sequences F1 and F2 are decoded exactly at transitions X1 and X2, respectively. Since the transition X3 is missing, the sequence decoded at transition X4 has a value of E. Thus, three sequences are

TABLE 1

| | CONDITIONS | DECODE VALUES | ACCEPTABLE/ UNACCEPTABLE | SYNC TEST | TRIGGER LOCATION |
|---|---|---|---|---|---|
| 1 | no defects | DDC | acceptable | C | X4 |
| 2 | X1 missing | ECC | acceptable | A | X5 |
| 3 | X2 missing | DEC | acceptable | A | X5 |
| 4 | X3 missing | DDE | acceptable | A | X5 |
| 5 | X4 missing | DDC | acceptable | D | X5 |
| 6 | X5 missing | DDC | acceptable | C | X4 |
| 7 | drop-in F1 | AADCC | acceptable | A | X5 |
| 8 | drop-in F1 | CADCC | unacceptable | — | — |
| 9 | drop-in F1 | ACDCC | unacceptable | — | — |
| 10 | drop-in F2 | DAACC | unacceptable | — | — |
| 11 | drop-in F2 | DCACC | unacceptable | — | — |
| 12 | drop-in F2 | DACCC | unacceptable | — | — |
| 13 | drop-in F3 | DDAAC | unacceptable | — | — |
| 14 | drop-in F4 | DDCAA | unacceptable | C | X4 |
| 15 | drop-in F5 | DDC | acceptable | C | X4 |

More specifically, in condition No. 1 of table 1, no defects are present within sequences F1–F5. As a result, decoded (i.e. sequences F1, F2 and F3/F4 at transitions X1, X2 and X4, respectively) in which two sequences are decoded exactly (i.e. sequences F1 and F2 at transitions X1 and X2, respectively) and the third sequence is of a length at least equal to C, whereby an accurate reference location within the servo mark portion can be determined. As such, this situation represents an acceptable decode situation, whereupon the timing reference mark is generated at transition X5.

In condition No. 5, transition X4 is missing. However, the sequences F1, F2 and F3 are decoded exactly at transitions X1, X2 and X3, respectively. Thus, since an accurate reference location within the servo mark portion can be determined, this situation represents an acceptable decode situation. As is to be appreciated, assuming an acceptable SYNC TEST value as hereinafter described, a timing reference mark would normally have been generated at transition X4. However, since transition X4 is missing, the timing reference mark is generated at transition X5.

In condition No. 6, transition X5 is missing. However, sequences F1, F2 and F3 are decoded exactly at transitions X1, X2 and X3, respectively, so that an accurate reference location within the servo mark portion can be determined. Therefore, this represents an acceptable decode situation and a timing reference mark is generated at transition X4. As is to be appreciated, since the timing reference mark is generated at transition X4, the absence of transition X5 does not affect the generation of the timing reference mark. In other words, condition No. 6 produces the same result as condition No. 1. If a drop-in or "extra" transition is detected in sequence F1, then one of three conditions may develop as indicated by condition Nos. 7, 8 and 9. More specifically, in condition No. 7, the drop-in transition in sequence F1 is positioned such that the sequence decoded at the drop-in transition and the sequence decoded at the transition X1 each has a value of A (which has been defined as a length less than C). Thereafter, since no other defects are present, the sequences F2, F3 and F4 are decoded exactly at transitions X2, X3 and X4, respectively. As previously described, in the present algorithm, sequences decoded as having a value of A are not counted as decoded sequences. However, since the sequences F2, F3 and F4 are decoded exactly, an accurate reference location within the servo mark portion can be determined. As a result, condition No. 7 represents an acceptable condition, such that a timing reference mark is generated at transition X5.

On the other hand, in condition No. 8, the drop-in transition in sequence F1 is positioned such that the sequences decoded at the drop-in transition and at the transition X1 have values of C and A, respectively. Similarly, in condition No. 9, the sequences decoded at the drop-in transition and at transition X1 have values of A and C, respectively. As a result, in conditions Nos. 8 and 9, three values of C are decoded. As the detection of three or more identical values could produce uncertainty in the timing reference mark location, the present algorithm interprets such detection as an unacceptable condition. As such, a timing reference mark is not generated.

If an extra transition is detected in sequence F2, then one of three conditions may develop as indicated by conditions Nos. 10, 11 and 12. As is to be appreciated, since no other defects are present in each of these conditions, the F1, F3 and F4 sequences are decoded exactly at transitions X1, X3 and X4, respectively. In conditions Nos. 11 and 12, the extra transition in sequence F2 is positioned such that the sequences decoded at the extra transition and at transition X2 have values of C and A, and A and C, respectively. As a result, three values of C are decoded so that an unacceptable condition exists whereupon a timing reference mark is not generated. In condition No. 10, on the other hand, the extra transition is positioned such that the sequences decoded at the extra transition and at transition X2 each have a value of A. As the presence of one or more decoded values of A in any sequence, except as in condition No. 7, could cause uncertainty in the timing reference mark location, the present algorithm interprets such a condition as unacceptable. As such, a timing reference mark is not generated.

In condition No. 13, an extra transition is decoded in sequence F3. As is to be appreciated, since the proper length of sequence F3 has a value of C, when an extra transition is detected therein, only the condition illustrated in condition No. 13 is possible. Although in this condition sequences F1, F2 and F4 are decoded exactly at transitions X1, X2 and X4, respectively, since two value A's are detected in sequence F3, the present algorithm interprets this condition as unacceptable. As a result, a timing reference mark is not generated.

In condition No. 14, an extra transition is detected in sequence F4. Nevertheless, sequences F1, F2 and F3 are decoded exactly at transitions X1, X2 and X3, respectively, so that an accurate reference location within the servo mark portion can be determined. However, due to the extra transition in sequence F4, two value A's are detected therein, that is, one at the extra transition and one at transition X4. As a result, the exact location of either trigger location, that is, at transition X4 or X5, is uncertain. Thus, this condition is unacceptable and a timing reference mark is accordingly not generated.

In condition No. 15, an extra transition is present in sequence F5. However, prior to the detection of the extra transition, sequences F1, F2 and F3 are decoded exactly at transitions X1, X2 and X3, respectively, and the decoded value obtained at transition X4 agree with the hereinafter described SYNC TEST value. As a result, a timing reference mark is generated at transition X4. Thus, as is to be appreciated, the extra transition in sequence F5 does not affect the generation of the timing reference mark.

After an acceptable decode situation is determined to exist (e.g. one of conditions Nos. 1–7 and 15), a further check is performed prior to generating a reference mark at the trigger transitions X4 or X5. That is, the sequence immediately prior to the trigger transition is decoded and compared to a predetermined value. If the decoded length is substantially equal to the predetermined value, then the timing reference mark is generated as previously described. On the other hand, if the decoded length is not substantially equal to the predetermined value, then the trigger transition location is considered to be uncertain and, as a result, the timing reference mark is not generated.

More specifically, in condition Nos. 1, 6 and 15 of Table 1, the timing reference mark is to be triggered at transition X4. As such, the immediately preceding sequence F4 has a sequence length of C; and if the decoded length of the sequence which follows exactly decoded sequences F1, F2 and F3 is C (as in the case for these conditions), then the reference mark is generated at transition X4. Table 1 indicates the condition of this decoded sequence F4 as C in the column identified as "SYNC TEST". However, as previously described, if the length of sequence F4 is greater than C for the condition wherein sequences F1, F2 and F3 are detected exactly, then a reference mark is not generated at transition X4 but is generated at transition X5, as indicated at condition 5. Further in conditions Nos. 2, 3, 4 and 7, the timing reference mark is triggered at transition X5 because the sequence (F5) which follows the detection of the three sequences has a sequence length of S which, in a preferred embodiment, has a value of 3. However, the present algorithm classifies decoded lengths into only four different values (E, D, C and A) which does not include S. As a result, sequence F5 is decoded as having a length of value A. Therefore, for conditions 2, 3, 4 and 7 wherein F1/F2, F3, F4; F1, F2/F3, F4; F1, F2, F3/F4; and F2, F3, F4 are detected, the timing reference mark is generated at transition X5 only if the decoded length of sequence F5 is equivalent to A.

In condition No. 5, the timing reference mark is triggered at transition X5 because transition X4 is missing. The sequence following the proper detection of three sequences (F1, F2 and F3) has a length of at least C (the combination of sequences F4 and F5). Therefore, the timing reference mark is generated at transition X5 only if the decoded length of the sequence (F4/F5) which follows the three properly detected sequences is D or E.

In condition No. 14, as previously described, an accurate reference location within the servo mark portion can be determined. However, due to the drop-in transition in sequence F4, this sequence is decoded to produce two value A's therein. As a result, the location of the trigger transition is uncertain, whereupon a timing reference mark is not generated.

As is to be appreciated, since the decoded values obtained for conditions Nos. 8-13 are unacceptable such that a timing reference mark is not to be generated, as previously described, a sync test value is not provided.

Figure 5:
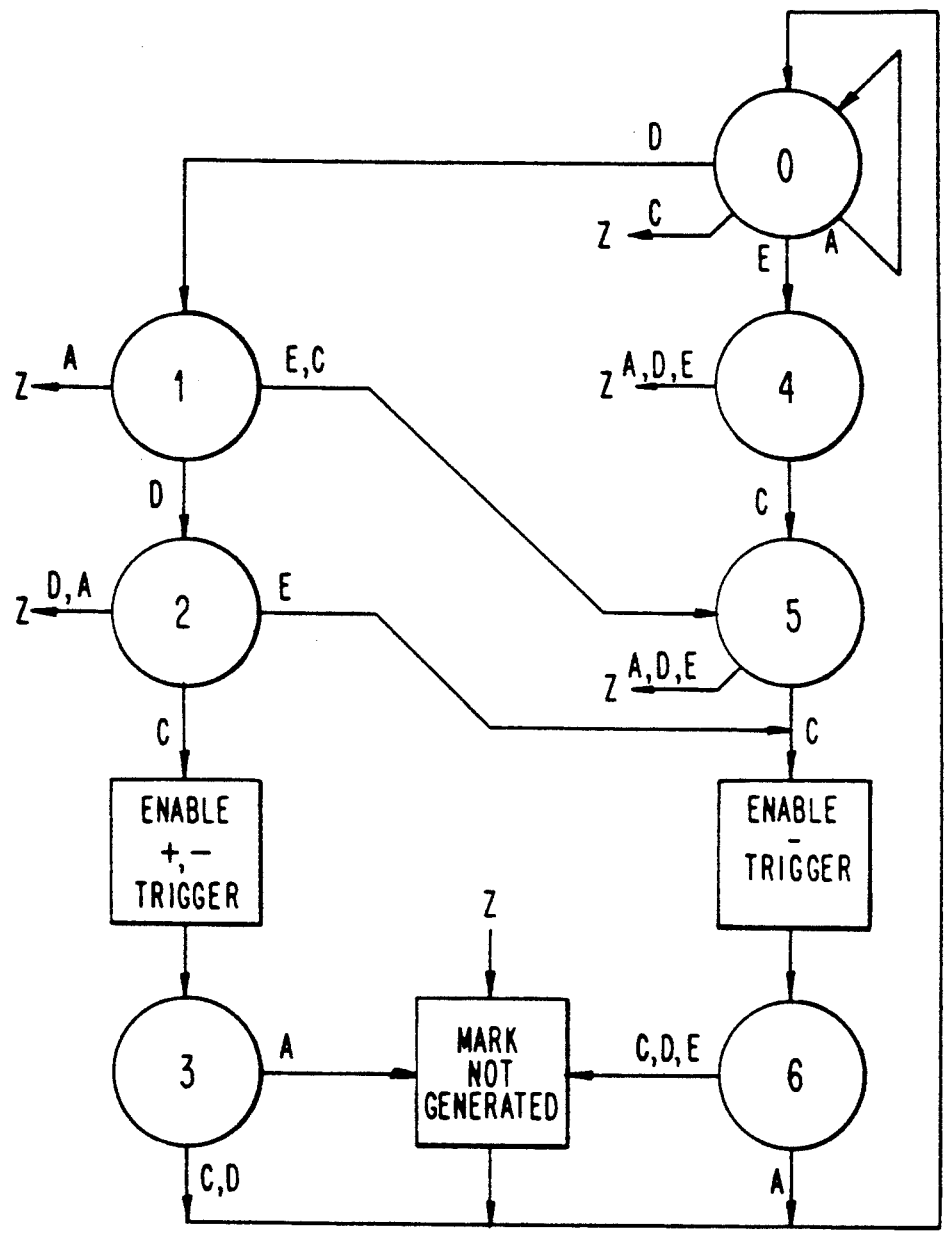
FIG. 5 is a state diagram to which reference will be made in describing the generation of a servo mark in accordance with an embodiment of the present invention.

FIG. 5 is a state diagram of the present algorithm which substantially corresponds to the above-described conditions of Table 1. More specifically, state 0 represents an initial processing state. Upon detecting a value of A as, for example, in condition No. 7 or 9 of Table 1, processing is returned to state 0. As long as a value of A is detected in state 0, processing continues in this loop. However, upon decoding a value of C, D or E, processing exits this loop. That is, upon decoding a sequence length having a value of D (e.g. as in conditions nos. 1, 3-7 and 10-15), processing proceeds from state 0 to state 1. However, if the value of C is decoded at state 0 as, for example, in condition no. 8, then as is to be appreciated, regardless of the subsequent decoded values, the condition is unacceptable as previously described. On the other hand, if a value of E is decoded in state 0, as in condition no. 2, processing proceeds from state 0 to state 4.

Since the present algorithm cannot accommodate multiple defects, as previously described, detection of a value of A, D or E at state 4 results in an unacceptable condition. More specifically, since an E was decoded at transition X2 while in state 0, a single defect has already occurred, that is, transition X1 has dropped-out. As a result, any additional defects, as evident by the subsequent decoding of an A, D or E, causes the condition to be unacceptable. On the other hand, if the value of C is decoded at state 4, as in condition No. 2, then processing proceeds to state 5.

Detection of a value of A, D or E while in state 5 is caused by multiple defects and, as such, is an unacceptable condition. However, detection of a value of C while in state 5, as in condition No. 2, is an acceptable condition. Since three sequences were decoded, in which each has a value equal to or greater than C and in which two of the sequences were decoded exactly, an accurate reference location within the servo mark portion can be determined. As a result, a transition trigger for generating a timing reference mark is enabled and processing proceeds to state 6.

State 6 corresponds to the previously described SYNC TEST section of Table 1. That is, state 6 decodes the sequence following the successful decoding of three sequences. In the present example, state 6 decodes the sequence F5. As a result, if the decoded value obtained while in state 6 is A, then a timing reference mark is generated at transition X5, as previously described, whereupon processing returns to state 0 so as to begin the processing of a servo mark pattern in a new sector. However, if the value decoded while in state 6 is C, D or E, thus indicating that the trigger transition location is uncertain, then the timing reference mark is not generated, whereupon processing returns to state 0 so as to process the servo mark pattern in a new sector.

If the value D is decoded while in state 0, the state machine advances to state 1. Obtaining a decoded value of A while in state 1, as in conditions Nos. 10 and 12, indicates an uncertainty in the timing reference mark location. Consequently, as previously described, regardless of the subsequent decoded values, this condition is unacceptable. On the other hand, a decoded value of C or E while in state 1, as in conditions Nos. 3 and 11, represents an acceptable decoded value and, as such, allows processing to proceed to state 5. Processing from state 5 has been previously described and need not be discussed further.

A decoded value of D while in state 1, as in conditions Nos. 1, 4–6 and 13–15, is an acceptable value, and as such, allows the processing to proceed to state 2. While in state 2, if a decoded value of E is obtained, as in condition No. 4, processing proceeds so as to enable the transition trigger. More specifically, since three sequences were decoded (i.e. sequences F1, F2 and F3/F4) with a value equal to or greater than C (i.e. D, D and E, respectively) and in which two of the sequences were decoded exactly (i.e. sequences F1 and F2), an accurate reference location within the servo mark portion can be determined. Hence, the transition trigger for generating a timing reference mark is enabled, whereupon processing proceeds to state 6 as previously described.

If a decoded value of C is obtained while in state 2, as in condition nos. 1, 5, 6, 14 and 15, then since an accurate reference location within the servo mark portion can be determined, the transition trigger is enabled and processing proceeds to state 3. On the other hand, decoding a value of A or D while in state 2 is an unacceptable condition. That is, decoding a value of A after the proper decoding of two D values, indicates an uncertainty in the timing reference mark location as previously described and is unacceptable. Further, as is to be appreciated, decoding a value of D while in state 2 can only be obtained by multiple defects (e.g. if transition X3 is missing and sequence F4 contains a drop-in transition) and it too is an unacceptable condition.

State 3 corresponds to the previously described state 6 and senses the decoded sequence following the proper decoding of three sequences. As a result, if the value decoded while in state 3 is C or D, as in conditions Nos. 1, 5, 6 and 15, then the timing reference mark is generated at the corresponding transition location and processing returns to state 0. On the other hand, if the value decoded while in state 3 is A, as in condition No. 14, the trigger location is uncertain. As a result, the timing reference mark is not generated and processing returns to state 0 so as to begin the processing of a new sector. It will be seen that, while in state 3, the value E cannot be present.

The unacceptable conditions obtained in states 0, 1, 2, 4 and 5 inhibit the timing reference mark from being generated. Afterwards, processing returns to state 0 as previously described.

FIG. 6 is a state table which corresponds to the state diagram of FIG. 5. In the interest of brevity, only the portion of FIG. 6 contained within the broken lines will be explained below.

The portion of FIG. 6 contained within the broken lines corresponds to states 2 and 3 of FIG. 5. More specifically, a decoded value of A or D obtained while in state 2 is indicative of an unacceptable condition whereupon a timing reference mark is not generated and processing returns to state 0 as indicated in the Next State column of FIG. 6. On the other hand, a decoded value of C or E while in state 2 permits the transition trigger to be enabled, whereupon processing proceeds to the corresponding state 3 or 6 as indicated in the Next State column. Likewise, while in state 3, regardless of the decoded value, processing proceeds to state 0.

The SYNC enable—and the SYNC enable+columns of FIG. 6 indicate the location of a generated timing reference mark. More specifically, in the present algorithm, "SYNC enable 31" refers to the transition X5 and "SYNC enable +" refers to the transition X4. Further, a value "1" represents an inactive state and a value "0" represents an active state. Therefore, as is to be appreciated, for all decoded values obtained while in state 2 and for decoded values of A or E obtained while in state 3, a timing reference mark is not generated. On the other hand, while in state 3, when a decoded value of C is obtained, a timing reference mark is generated at transition X4 as indicated by a 0 in the SYNC enable +column. Similarly, when a decoded value of D is obtained while in state 3, a timing reference mark is generated at transition X5 as indicated by the 0 in the SYNC enable-column.

The state table of FIG. 6 can be stored in a read-only memory (ROM) and written therefrom onto a disk in a well-known manner.

Figure 7:
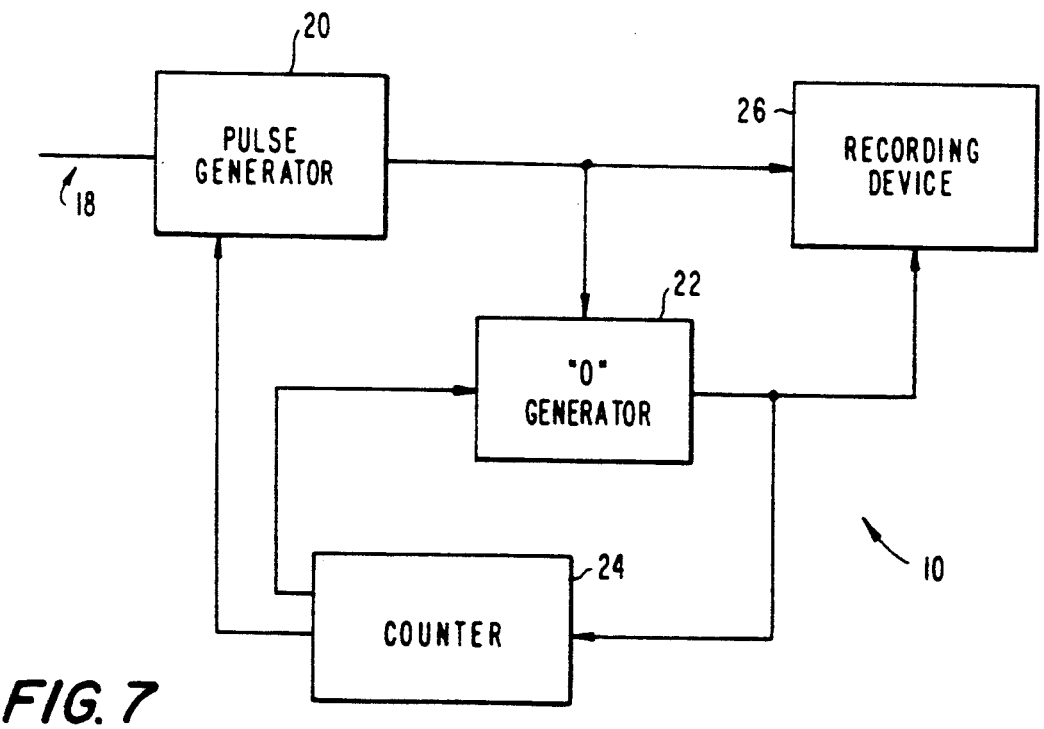
FIG. 7 is a block diagram of an apparatus for writing the servo mark signal pattern onto a disk in accordance with an embodiment of the present invention.

FIG. 7 illustrates a block diagram of an apparatus for writing the present servo mark signal pattern onto a dedicated servo mark portion of a magnetic disk in accordance with an embodiment of the present invention. As shown in FIG. 7, writing apparatus 10 generally comprises a pulse generator 20, a "0" generator 22, a counter 24 and a recording device 26. More specifically, generator 20 is coupled to an input line 18 and is adapted to generate a pulse and to supply the same to recording device 26. Each pulse from generator 20 is further supplied to "0" generator 22 which, upon receipt thereof, is adapted to supply "0" data bits to recording device 26. Each "0" data bit from generator 22 is further supplied to counter 24 which counts the received "0" data bits and, upon reaching a predetermined number of "0" data bits, generates an enabling signal and an inhibiting signal which are supplied to generator 20 and generator 22, respectively.

In operation, upon receiving an input request signal from a user via line 18, pulse generator 20 supplies a pulse to recording device 26 which is thereafter recorded as a transition onto the servo mark portion of the disk. The pulse from generator 20 also enables generator 22 to begin supplying "0" data bits (or the absence of pulses) to recording device 26. Each "0" data bit supplied from generator 22 is counted in counter 24. After a predetermined number of "0" data bits have been produced, counter 24 supplies an enabling signal to generator 20 so as to enable generator 20 to supply another pulse to recording device 26 for recording a transition of opposite polarity. Simultaneously therewith, counter 24 supplies an inhibiting signal to generator 22, so as to inhibit the supply of "0" data bits to recording device 26. Processing continues in this manner until the entire servo mark pattern has been written onto the servo mark portion of the disk, whereupon counter 24 supplies an inhibiting signal to generators 20 and 22 so as to deactivate the generators.

Figure 8:
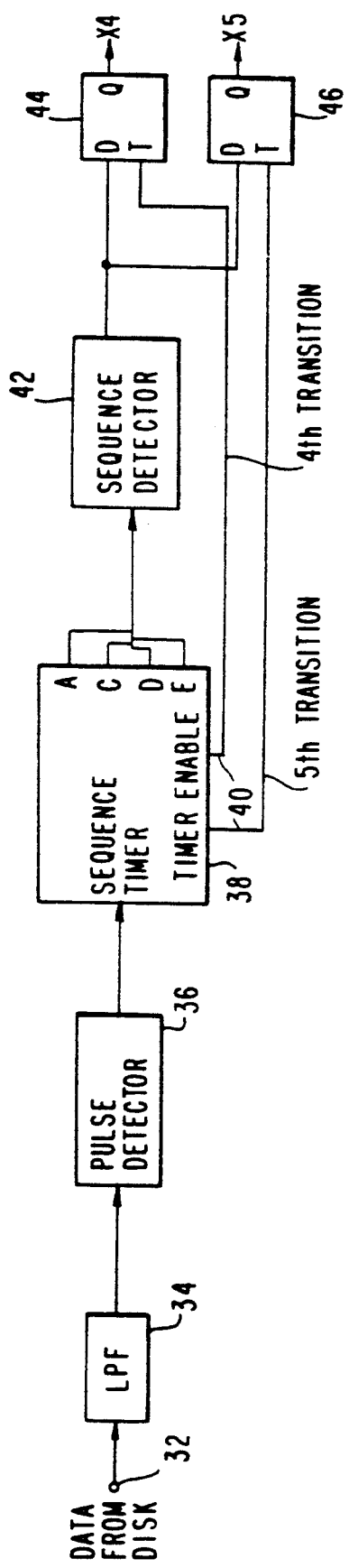
FIG. 8 is a block diagram of a preferred embodiment of a servo mark detector.

FIG. 8 illustrates a block diagram of an apparatus for decoding the sequences contained within the above-mentioned servo mark portion and for generating an accurately located reference mark in accordance with an embodiment of the present invention. In FIG. 8, input data read from a disk, such as the servo mark pattern, is supplied from an input terminal 32 to a pulse detector 36 via a low pass filter 34. The pulse detector may be of conventional construction and operates to sense transitions X1, X2, etc., which are coupled to a sequence timer 38.

The sequence timer measures the time between successive transitions. In the preferred embodiment, sequence timer 38 counts bit cells from one transition to the next and is supplied with reference values to determine the length of a sequence. More particularly, the sequence timer is supplied with values representing sequence lengths D and C and assigns a value to each sequence supplied thereto. As is appreciated, if successive transitions are separated by more than F1 (or F2) bit cells, the sequence is assigned a value E If successive transitions are separated by F1 (or F2) bit cells, the sequence is assigned a value D. If successive transitions are separated by a number of bit cells in the range of less than F1 (or F2) but not less than F3 (or F4), the sequence is assigned a value C. And if successive transitions are separated by less than F3 (or F4) bit cells, the sequence is assigned a value A. Sequence timer 38 also produces a timing pulse at a time enable output 40 in response to the fourth transition received from pulse detector 36 and, if the first two detected sequences both are of a length less than D (e.g. condition 7 of Table 1), the timing pulse is produced in response to the sixth transition. As will be described, the timing pulse is used to generate the timing reference mark at the correct trigger location X4 or X5 depending upon whether a particular transition has dropped out or a particular sequence is provided with a drop-in.

Sequence timer 38 supplies a sequence detector 42 with the sensed values of received sequences in the order in which those sequences are received. The sequence detector is comprised of logic circuitry for sensing if successive values produced by sequence timer 38 are equal to DDC (conditions 1, 5, 6 and 15), ECC (condition 2), DEC (condition 3), DDE (condition 4) or AADCC (condition 7). If so, an output signal is supplied from sequence detector 42 to condition D-type timing flip-flop circuits 44 and 46. Depending upon whether a timing pulse is produced by sequence timer 38 in response to the fourth or fifth transition detected by pulse detector 36, as described above, either flip-flop circuit 44 or flip-flop circuit 46 is triggered to generate the timing reference mark at trigger location X4 or trigger location X5. Thus, acceptable sequences are detected and the timing reference mark is generated at the proper location.

Although not shown in FIG. 8, the timing reference marks at trigger locations X4 and X5 are supplied to further apparatus for use in locating the start of servo burst data. This further apparatus includes a delay circuit for delaying the timing reference mark generated at trigger location X4 (i.e. the timing reference mark produced by flip-flop circuit 44) such that an accurately timed reference mark is produced at a reference location, regardless of drop-outs and drop-ins, so long as two-of-three sequence lengths are equal to their designated lengths and a third sequence length, if not equal to its designated length, is at least equal to C.

Thus, in the present invention, upon decoding three sequences from the sequence arrangement contained in the servo mark portion, a determination is made as to whether an accurately located timing reference mark can be generated. If the accuracy of the timing reference mark can be assured, then the mark is generated at the appropriate trigger transition location provided that such trigger location is not uncertain. On the other hand, if the accuracy of the timing reference mark location cannot be assured, then the mark is not generated. By using the accurately located timing reference mark as a timing reference, the start of the servo burst data can be readily located. As a result, the length of the servo burst data portion can be minimized, thereby increasing the area available for informational data. Furthermore, the present invention provides defect immunity against a defect which is likely to occur, that is, a dropped out transition. Thus, the generation of the timing reference mark is not inhibited by a transition dropping out anywhere in the servo mark portion. Reference mark generation is also not inhibited by a drop-in transition which may occur in predetermined sequences. By so specifying the permissible defects, the overall circuit complexity and cost of the present decode apparatus can be minimized. However, as previously mentioned, the present invention is not so limited and can be readily modified to accommodate a larger number of defects.

Although a preferred embodiment of the present invention and various modifications have been described in detail herein, it is to be understood that this invention is not limited solely thereto and other modifications and variations may be effected therein by one skilled in the art without departing from the spirit and scope of the invention. For example, rather than provide sequences of fixed lengths F1, F2, F3 and F4, each sequence may be formed of a permitted range of lengths. Hence, the value N in FIG. 4A may be 10<N<15, and a similar range may be provided for M and for S.

It is intended that the appended claims be interpreted as covering the embodiment discussed herein, variations and alternatives that have been described, and all equivalents thereto.

What is claimed is:

1. A method of generating a signal mark pattern for a disk storage system for distinguishing servo data from informational data, said method comprising the steps of: generating a first plurality of mark data sequences each having a first length, generating a second plurality of mark data sequences each having a second length, in which at least one mark data sequence contained in the first and second pluralities of mark data sequences has a data run-length greater than a predetermined data run-length, generating a reference signal located after said second plurality of mark data sequences, and recording said signal mark pattern including said reference signal in an area located prior to said servo data.

2. The method of claim 1 wherein said first length is larger than said second length.

3. The method of claim 1 wherein said first length is smaller than said second length.

4. The method of claim 1 wherein the number of said first plurality of mark data sequences is two and the number of said second plurality of mark data sequences is two.

5. The method of claim 1 wherein said servo data is recorded downstream of a recovery portion; and wherein said step of recording includes the step of recording said signal mark pattern in an area located between said recovery portion and said servo data.

6. The method of claim 1 wherein each mark data sequence contained within said first and said second pluralities of mark data sequences is defined by a respective data level transition located at opposite ends thereof and a lack of data level transitions therebetween.

7. The method of claim 6 wherein said adjacent data level transitions have polarities which are opposite to each other.

8. The method of claim 1 wherein each data mark sequence contained within said first and said second pluralities of mark data sequences includes a respective predetermined number of consecutive bit cells of a predetermined pattern.

9. The method of claim 8 wherein each value of said consecutive bit cells is the same.

10. The method of claim 1 wherein said reference signal includes a first trigger mark and a second trigger mark located a predetermined length from said first trigger mark.

11. The method of claim 10 wherein said first length is larger than said second length and said second length is larger than said predetermined length between said first and second trigger marks.

12. The method of claim 10 wherein said predetermined length between said first and second trigger marks is larger than said second length and said second length is larger than said first length.

13. The method of claim 10 wherein said first and second trigger marks are respective first and second data level transitions having polarities which are opposite to each other.

14. A method of generating a reference mark from a signal pattern having a first plurality of data sequences each having a first length, a second plurality of data sequences each having a second length, in which at least one data sequence contained in the first and second pluralities of data sequences have a data run-length greater than a predetermined data run-length, and a reference signal located after said second plurality of data sequences, said method comprising the steps of:

detecting the lengths of a predetermined number of said data sequences contained within said first and second pluralities of data sequences, determining whether the detected lengths satisfy predetermined criteria indicative of whether an accurately located reference mark can be generated, and generating said reference mark so as to coincide with said reference signal only if said criteria are satisfied.

15. The method of claim 14 wherein said reference signal includes a first trigger mark and a second trigger mark located a predetermined length from said first trigger mark.

16. The method of claim 14 wherein each of said data sequences is comprised of a respective number of bit cells of a predetermined pattern between adjacent transitions.

17. The method of claim 14 wherein each sequence is defined by transitions having polarities which are opposite to each other.

18. The method of claim 17 wherein the number of said first plurality of data sequences is two and the number of said second plurality of data sequences is two.

19. The method of claim 18 wherein said step of detecting detects the lengths of three data sequences contained within the combination of said first and second pluralities of data sequences.

20. The method of claim 19 wherein said step of detecting comprises sensing the duration between each of said transitions.

21. The method of claim 20 wherein said reference signal includes two trigger marks separated by a predetermined length and wherein said reference mark is generated at the trigger mark occurring after the lengths of three data sequences from the combination of said first and second pluralities of data sequences have been sensed and determined to satisfy said criteria.

22. The method of claim 21 further comprising the step of detecting the length of said predetermined length between said two trigger marks and wherein said reference mark is generated at the respective trigger mark occurring after the lengths of three data sequences from the combination of said first and second pluralities of data sequences have been sensed and determined to satisfy said criteria provided that the detected length at which said respective trigger mark occurs after the last of said three data sequences is equal to at least a predetermined length.

23. The method of claim 14 wherein said criteria includes detecting three data sequences having respectively prefixed lengths from the combination of said first and second pluralities of data sequences.

24. The method of claim 15 wherein said reference signal is generated so as to coincide with one of said first and second trigger marks.

25. A method of generating a reference mark from a signal pattern having a first plurality of data sequences each having a first length, a second plurality of data sequences each having a second length, in which at least one data sequence contained in the first and second pluralities of data sequences has a data run-length greater than a predetermined data run-length, and a reference signal located after said second plurality of data sequences, said method comprising the steps of: detecting the lengths of a predetermined number of said data sequences contained within said first and second pluralities of data sequences, determining whether the detected lengths satisfy predetermined criteria indicative of whether an accurately located reference mark can be generated, said criteria including detecting three data sequences, two of which having respectively prefixed lengths and the third having a length equal to or greater than a pre-established amount, from the combination of said first and second pluralities of data sequences, and generating said reference mark so as to coincide with said reference signal only if said criteria are satisfied.

26. A method of generating a reference mark from a signal pattern having a first plurality of data sequences each having a first length, a second plurality of data sequences each having a second length, in which at least one data sequence contained in the first and second pluralities of data sequences has a data run-length greater than a predetermined data run-length and in which each data sequence contained in the first and second pluralities of data sequences is defined by a transition, and a reference signal located after said second plurality of data sequences having first and second trigger transitions separated from each other by a predetermined length, said method comprising the steps of: detecting the lengths of three data sequences contained within the combination of said first and second pluralities of data sequences, determining whether the detected three lengths satisfy predetermined criteria indicative of whether an accurately located reference mark can be generated, and generating said reference mark in response tot he respective one of said first and second trigger transitions which follows by more than a minimum length the detection of the three data sequences that satisfy said criteria only if said criteria are satisfied.

27. The method of claim 26 wherein said criteria comprises the detection of three of four data sequences having proper length from the data sequences contained within the combination of said first and second pluralities of data sequences, and said reference mark is generated in response to said second trigger mark if the length of one of said detected data sequences is greater than a maximum length.

* * * * *